United States Patent [19]
Kehrer

[11] Patent Number: 4,561,496
[45] Date of Patent: Dec. 31, 1985

[54] HEAT EXCHANGER FOR THE COOLING OF GASES, PARTICULARLY FROM THE SYNTHESIS OF AMMONIA

[75] Inventor: Wolfgang Kehrer, Berlin, Fed. Rep. of Germany

[73] Assignee: Borsig GmbH, Berlin, Fed. Rep. of Germany

[21] Appl. No.: 564,095

[22] Filed: Dec. 23, 1983

[30] Foreign Application Priority Data

Jan. 25, 1983 [DE] Fed. Rep. of Germany ....... 3302304

[51] Int. Cl.4 ............................................. F28F 27/02
[52] U.S. Cl. ................................... 165/103; 165/140; 122/412
[58] Field of Search ............... 165/140, 141, 160, 163, 165/158, 103; 122/412, 423, 427

[56] References Cited

U.S. PATENT DOCUMENTS

| | | | |
|---|---|---|---|
| 2,340,138 | 1/1944 | Morris | 165/140 |
| 2,819,882 | 1/1958 | Stephani | 165/140 |
| 3,753,662 | 8/1973 | Pagani et al. | 165/103 |
| 4,097,242 | 6/1978 | Tsuto et al. | 165/141 |
| 4,156,408 | 5/1979 | Protze | 165/103 |

FOREIGN PATENT DOCUMENTS

| | | | |
|---|---|---|---|
| 2539440 | 3/1977 | Fed. Rep. of Germany | 122/412 |
| 3024819 | 1/1982 | Fed. Rep. of Germany | 165/140 |
| 173966 | 1/1922 | United Kingdom | 165/140 |

Primary Examiner—Albert W. Davis, Jr.
Assistant Examiner—Peggy Neils
Attorney, Agent, or Firm—Max Fogiel

[57] ABSTRACT

A heat exchanger for the cooling of hot gases from the synthesis of ammonia. The heat exchanger has tubes which are bent into U-shape and are arranged within a shell. The tubes are inserted into a tube plate. An exit chamber and an entry chamber are arranged therein for the gases to be cooled adjacent the tube plate. Separating walls are arranged within the shell for the formation of closed preheating chambers and enclose the exit limbs of all tubes. The entry limbs extend within a separated middle space. A preheating chamber and the middle space are provided with separate connections for their own water passage.

3 Claims, 2 Drawing Figures

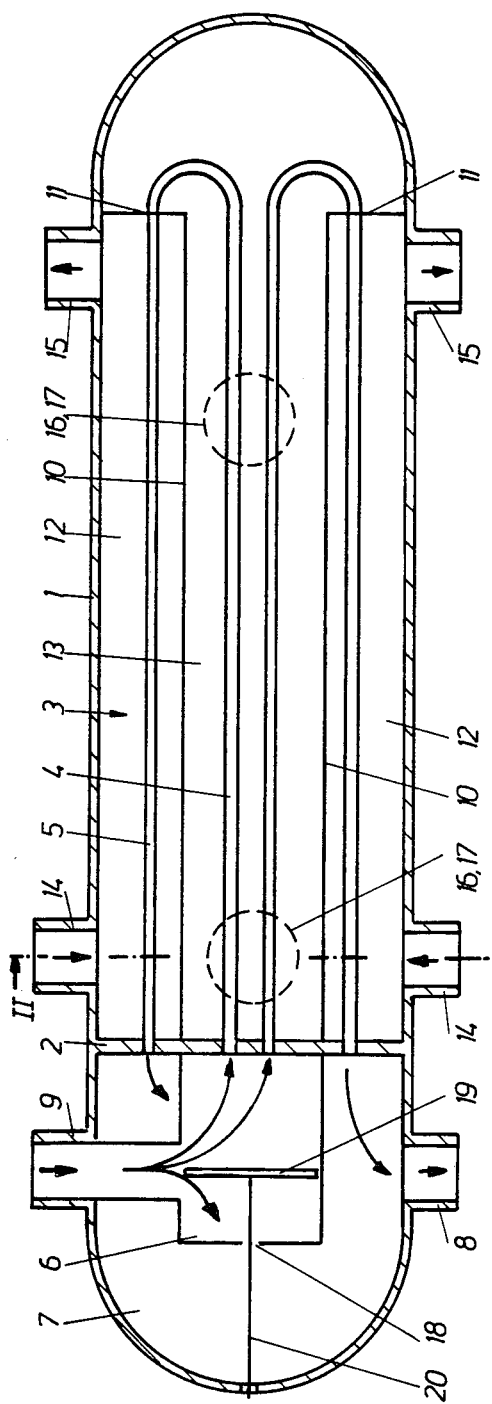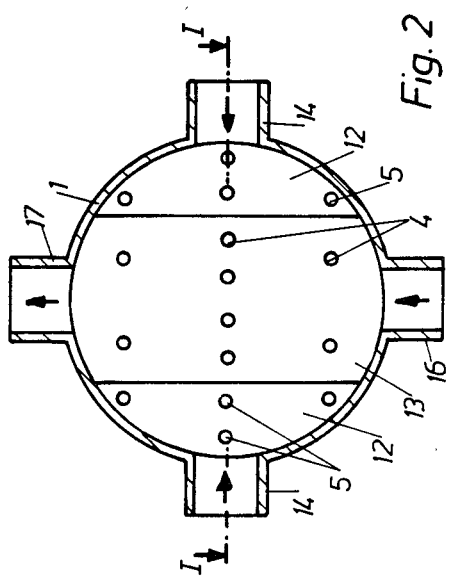

HEAT EXCHANGER FOR THE COOLING OF GASES, PARTICULARLY FROM THE SYNTHESIS OF AMMONIA

BACKGROUND OF THE INVENTION

The present invention concerns a heat exchanger for the cooling of hot gases, particularly from the synthesis of ammonia.

In known heat exchangers (DE-PS No. 20 07 528, DE-OS No. 30 49 409), evaporating water is employed exclusively as cooling medium for the cooling of the hot gases leaving an ammonia converter. This has the consequence that the gases cannot be cooled below the boiling point of the water. If lower temperatures are required, then the gases would have to be fed to a further heat exchanger, in which colder water flows around the gas-conducting heat exchanger tubes.

In order to set a certain final temperature of the cooled gases, it is, furthermore, known to admix a partial current of the hot gases to the already cooled gases. In a known heat exchanger (DE-PS No. 28 46 455), the partial current is conducted through a tube lying parallel with the heat exchanger tubes out of the gas entry chamber into the gas exit chamber. For the regulation of the partial quantity, the exit end of the tube is closable with the aid of a throttle cone.

Furthermore, a tube bundle steam generator is known (DE-OS No. 24 08 099), in which a part of the tubes is enclosed by a preheater shell. The feed stub for the water to be evaporated is led through the preheater shell. The preheater shell is connected with the tube plate at its one end and open at its other end.

The known tube bundle steam generator with built-in preheater zone can preheat only exactly as much water as is also evaporated. This is a disadvantage, because preheated water from the gas cooler is utilized also for other steam generators in ammonia plants. The separate arrangement of preheater and evaporator as gas cooler for ammonia plants is very expensive, since the equipment because of the high pressure of the gases require a great wall thickness for the housings.

SUMMARY OF THE INVENTION

The present invention is based on the task of improving a heat exchanger in such a manner that the cooling of the gases in the heat exchanger to below the boiling point of the water can take place through preheating and evaporation of the water in water quantities independent one of the other.

In the heat exchanger according to the present invention, the gases can be cooled to a relatively low temperature in a single apparatus. Since the chamber serving the preheating of water is completely separated from the portion of the heat exchanger serving for the evaporation of water, both processes can be operated completely decoupled and independently each of the other.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 1 shows a heat exchanger according to the present invention in horizontal longitudinal section I—I according to FIG. 2 (turned through 90° in clockwise sense); and FIG. 2 shows the section II—II according to FIG. 1 (turned through 90° in counterclockwise sense).

DESCRIPTION OF THE PREFERRED EMBODIMENTS

The illustrated heat exchanger serves preferably for the cooling of hot gases which leave an ammonia converter. The heat exchanger is arranged horizontally and has a pressure-tight shell 1. Connected with the shell 1 is a tube plate, in which tubes 3 are inserted. The tubes 3 are bent into U-shape and so arranged that the one limb 4 of each tube 3 comes to lie towards the center of the tube plate 2 and the other limb 5 towards the rim of the tube plate 2. Another arrangement of the tubes 3 bent into U-shape can also be chosen.

The tubes 3 are flowed through by the hot gases to be cooled. An entry chamber 6 and an exit chamber 7 serve for the feeding and removal of these gases. The exit chamber 7 is welded to the rim of the tube plate 2 and provided with an exit stub 8. An entry stub 9 is led through the exit chamber 7 into the entry chamber 6. The entry chamber 6 is arranged concentrically with the exit chamber 7 and connected with the tube plate 2 in such a manner that always one limb 4 of the tubes 3 bent into U-shape, opens into the entry chamber 9. This construction of the chamber in conjunction with the described arrangement of the tubes 3 bent into U-shape, results in a simple structure of the heat exchanger.

The hot gases flow through the heat exchanger in direction of the solid arrows. In this manner, the hot gases are cooled by a cooling medium which is conducted through the space externally of the tubes 3. Mutually separate chambers are formed in the interior of the shell 1 by separating walls 10 and 11, which are respectively connected with the tube plate 2 and with the shell 1. In the illustrated case, two preheating chambers 12 are formed, which are arranged in longitudinal direction of the heat exchanger and enclose the exit limbs 5 of the tubes 3. A middle space 13, through which the entry limbs 4 of the tubes 3 extend, remains between the preheating chambers 12.

The preheating chambers 12 are each provided in the proximity of the tube plate 2 with an inlet stub 14 and at the opposite end of the heat exchanger with an outlet stub 15, which are led through the shell 1. The cooling medium thereby flows in direction of the dashed arrows in counterflow to the hot gases through the preheating chambers 12. The middle space is provided with one or more inlet stubs 16 led through the lower part of the shell 1 and with one or more outlet stubs 17 led through the upper part of the shell 1. Here, too, the dashed arrows indicate the flow direction. The passage of the cooling medium through the preheating chambers 12 is thereby separated from the passage of the cooling medium through the middle space 13. Water is preheated in the preheating chambers 12 and subsequently conducted to an external, not illustrated steam generator plant.

The middle space 13 is acted on by water from a separating vessel, for example a steam drum of the steam generator plant. The water evaporates partially at the entry limbs 4 of the tubes 3. The water-steam mixture, which has thus arisen, is conducted back into the separating vessel.

The entry chamber 6 displays an opening, which produces a connection to the exit chamber 7, in its wall lying parallel with the tube plate 2. A slide 19, which is displaceable from the outside through a rod 20, which penetrates the opening 18, is arranged within the entry chamber 6 in the prolongation of the entry stub 9. The slide 19 wipes over the opening of the entry stub 9 into the entry chamber 6. According to the setting of the slide 19, a proportion of the entering gases lying between 0 and 100% can be conducted directly into the exit chamber 7, in order to set a desired exit temperature in the issuing gas.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Heat exchanger for the cooling of hot gases, particularly from the synthesis of ammonia, through evaporating water, comprising: a shell and a tube plate; a single bundle of tubes; tubes inserted into said tube plate and arranged in said shell; said tubes being bent into U-shape; an exit chamber and an entry chamber for the gases to be cooled adjoining said tube plate; stubs for supply and removal of water and connected to said shell; separating walls at least partially enclosing exit limbs of all tubes arranged within said shell to form a closed pre-heater chamber; said pre-heater chamber having separate connections for its own water through-flow; a portion of said bundle of tubes with said exit lying within one chamber and the remaining portion of said bundle of tubes being enclosed by the other chambers; said separating walls being connected with said tube plate and said shell and dividing the heat exchanger into two pre-heater chambers extending in longitudinal direction and a middle space lying there between; said heat exchanger being arranged horizontally; said entry chamber having an opening connected with said exit chamber; said entry chamber having an entry stub with a prolongation; a slide arranged in said prolongation and displaceable from the outside, said slide wiping over the opening of said entry stub into said entry chamber so as to feed a variable partial quantity of entering gases to said opening.

2. Heat exchanger for the cooling of hot gases, particularly from the synthesis of ammonia, through evaporating water, comprising: a shell and a tube plate; a single bundle of tubes; tubes inserted into said tube plate and arranged in said shell; said tubes being bent into U-shape; an exit chamber and an entry chamber for the gases to be cooled adjoining said tube plate; stubs for supply and removal of water and connected to said shell; separating walls at least partially enclosing exit limbs of all tubes arranged within said shell to form a closed pre-heater chamber; said pre-heater chamber having separate connections for its own water through-flow; a portion of said bundle of tubes with said exit lying within one chamber and the remaining portion of said bundle of tubes being enclosed by the other chambers; said separating walls being connected with said tube plate and said shell and dividing the heat exchanger into two pre-heater chambers extending in longitudinal direction and a middle space lying there between; said tubes being flowed through by hot gases to be cooled, said entry chamber and said exit chamber feeding and removing said hot gases, respectively; said exit chamber being welded to a rim of said tube plate and having an exit stub; an entry stub being passed through said exit chamber into said entry chamber; said entry chamber being arranged concentrically with said exit chamber and being connected with said tube plate so that always one limb of said tubes opens into said entry chamber; one of said separate connections being an inlet stub in proximity of said tube plate and another one of said connections being an outlet stub at an opposite end of the heat exchanger for flowing cooling medium in counterflow direction to said hot gases through said pre-heater chambers; said middle space having inlet stub means passed through a lower part of said shell and having outlet stub means passed through an upper part of said shell, passage of cooling medium through said pre-heating chambers being separated from passage of cooling medium through said middle space, water being pre-heated in said pre-heating chambers for conducting to an external means; said middle space receiving water evaporating partially at entry limbs of said tubes; said entry chamber having an opening producing a connection to said exit chamber in a wall lying parallel to said tube plate; a slide displaceable from outside through a rod penetrating said opening and being arranged within said entry chamber in a prolongation of said entry stub, said slide wiping over said opening of said entry stub into said entry chamber, a proportion of entering gases being conducted directly into said exit chamber depending on a setting of said slide for setting a desired exit temperature in exiting gas.

3. Heat exchanger for the cooling of hot gases, particularly from the synthesis of ammonia, through evaporating water, comprising: a shell and a tube plate; a single bundle of tubes; tubes inserted into said tube plate and arranged in said shell; said tubes being bent into U-shape; an exit chamber and an entry chamber for the gases to be cooled adjoining said tube plate; stubs for supply and removal of water and connected to said shell; separating walls at least partially enclosing exit limbs of all tubes arranged within said shell to form a closed pre-heater chamber; said pre-heater chamber having separate connections for its own water through-flow; a portion of said bundle of tubes with said exit lying within one chamber and the remaining portion of said bundle of tubes being enclosed by the other chambers; said entry chamber having an opening connected with said exit chamber; said entry chamber having an entry stub with a prolongation, a slide arranged in said prolongation and displaceable from the outside, said slide wiping over the opening of said entry stub into said entry chamber so as to feed a variable partial quantity of entering gases to said opening.

* * * * *